July 1, 1969 R. J. SCHULTZ ET AL 3,453,521
DC TO DC CONVERTER REGULATOR
Filed April 7, 1967 Sheet 1 of 2
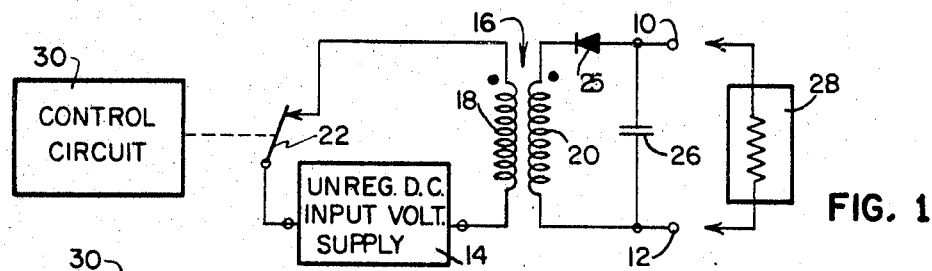
FIG. 1
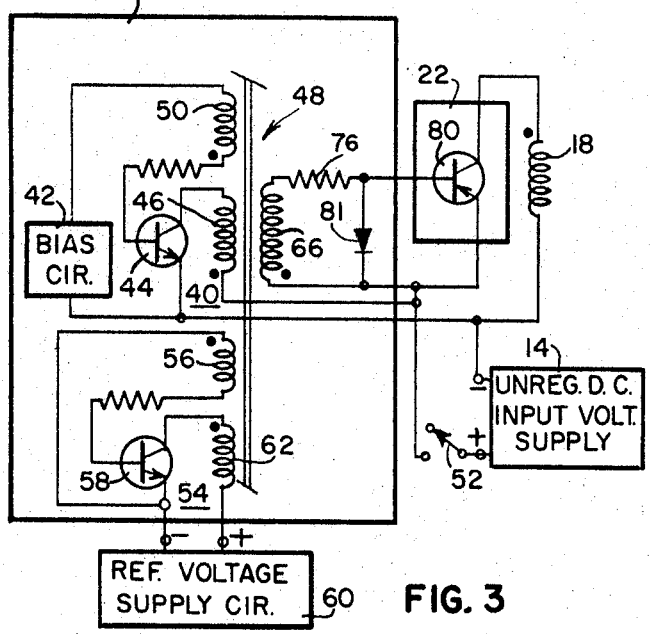
FIG. 3
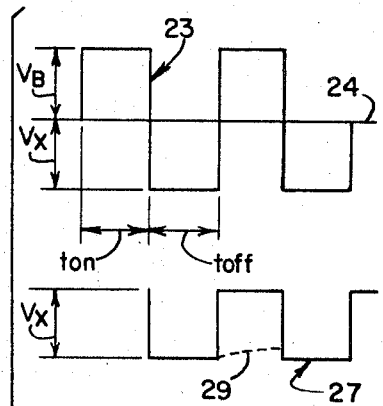
FIG. 2
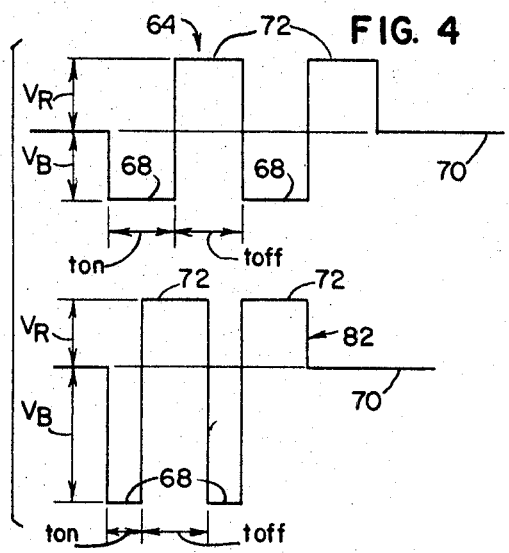
FIG. 4
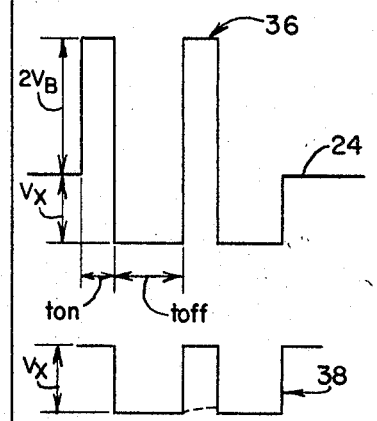
Inventors
ROBERT J. SCHULTZ
FRED J. CONFORTI
BY
Mueller, Aichele & Rauner
ATTYS.

# United States Patent Office 3,453,521
Patented July 1, 1969

3,453,521
DC TO DC CONVERTER REGULATOR
Robert J. Schultz, Aurora, and Fred J. Conforti, Wood Dale, Ill., assignors to Motorola, Inc., Franklin Park, Ill., a corporation of Illinois
Filed Apr. 7, 1967, Ser. No. 629,161
Int. Cl. H02m 3/32
U.S. Cl. 321—2          13 Claims

ABSTRACT OF THE DISCLOSURE

The regulator includes an inductor coupled in series with an electronic switch to a source of unregulated DC input voltage. The switch is periodically opened and closed by a control circuit. The inductor receives energy from the input source only during the time the switch is closed and delevirs this energy through a rectifier-filter circuit to a load only during the time the switch is open. The duration for which the switch is closed is varied inversely proportional to the input voltage and the duration of time for which the switch is open may be held contsant for a nominally regulated DC output voltage, or varied through a feedback control circuit to provide a regulated DC output voltage.

Background of the invention

Motor vehicles may be equipped with various voltage batteries whereas a particular piece of electronic equipment requires a predetermined fixed voltage for proper operation. Also, the voltage output of a given battery may change, due, for example, to its state of charge, and to aging or loading effects of other electronic systems energized therefrom.

In the past, DC to DC converter regulators for maintaining a required fixed voltage have not been responsive to a voltage range sufficient to accommodate the wide variety of battery voltages presently available without adding to production costs by changing parts and/or changing the tap on a power transformer. In fact, such converter regulators have not been entirely successful in providing a regulated voltage over the entire useful life of the battery.

Certain types of electronic equipment such as two-way radios alternate between a heavy load when the transmitter is used and a light load when the receiver is used. Prior art regulators do not maintain a constant voltage over a sufficiently wide range of loads so that the output power may drop off during transmitter operation. Also, the efficiency of presently known regulators is reduced as the unregulated input voltage increases to thereby lessen useful battery life. Lastly, some such known regulators have common DC connections between the input and output circuits so that they would not be usable when the particular electronic equipment to be supplied from the battery has a negative ground and the equipment has a positive ground or vice versa.

Summary of the invention

It is therefore an object of this invention to provide a system for converting a wide range of unregulated DC voltages into a regulated DC output voltage.

Another object is to provide a converter regulator which generates a regulated DC voltage with wide variations in the load presented by the circuits energized by the converter regulator.

Another object is to maintain high efficiency over the range of the unregulated DC input voltage.

A further object is to provide a converter regulator usable with either positive or negative ground reference.

A further object is to provide a low cost converter regulator which has a minimum size to permit use thereof in portable radio equipment.

In practicing the invention, a DC to DC converter regulator includes a control circuit having a saturating core inductor to develop a control signal which alternates between first and second voltage levels, with the first level existing for a first duration inversely proportional to an unregulated variable DC input voltage and with the second level existing for a second substantially constant duration related to a reference voltage. An electronic switching device is coupled in series circuit with a further inductor and the unregulated input voltage supply. The switching device is driven into a closed state by said first voltage level and into an open state by said second voltage level to alternately conduct the DC input voltage to the further inductor to generate a pulsating signal thereacross having first and second alternating polarity portions during the closed and open states respectively, with the amplitude of the first portions being proportional to the input voltage. The further inductor time averages the energy of these portions whereby the amplitude of the second portion is substantially constant and independent of the amplitude of the input voltage. A rectifier is coupled between the further inductor and a filtering circuit within which a regulated DC output voltage is derived. The rectifier is poled with respect to the polarity of the further inductor and the input voltage to conduct only the second portion so that voltage is supplied to the filtering circuit only during the open state of the switching device. Thus, the output voltage has a substantially constant amplitude equal to the amplitude of the second portion.

Brief description of the drawings

FIG. 1 schematically illustrates the converter regulator of the invention including an electronic switch and a control circuit (block representation) for actuating the switch;

FIG. 2 shows the pulsating signals developed by the electronic switch and the waveforms across the filtering circuit;

FIG. 3 schematically illustrates the control circuit of FIG. 1;

FIG. 4 shows the control signals developed by the control circuit of FIG. 3;

Detailed description

Figure 5:
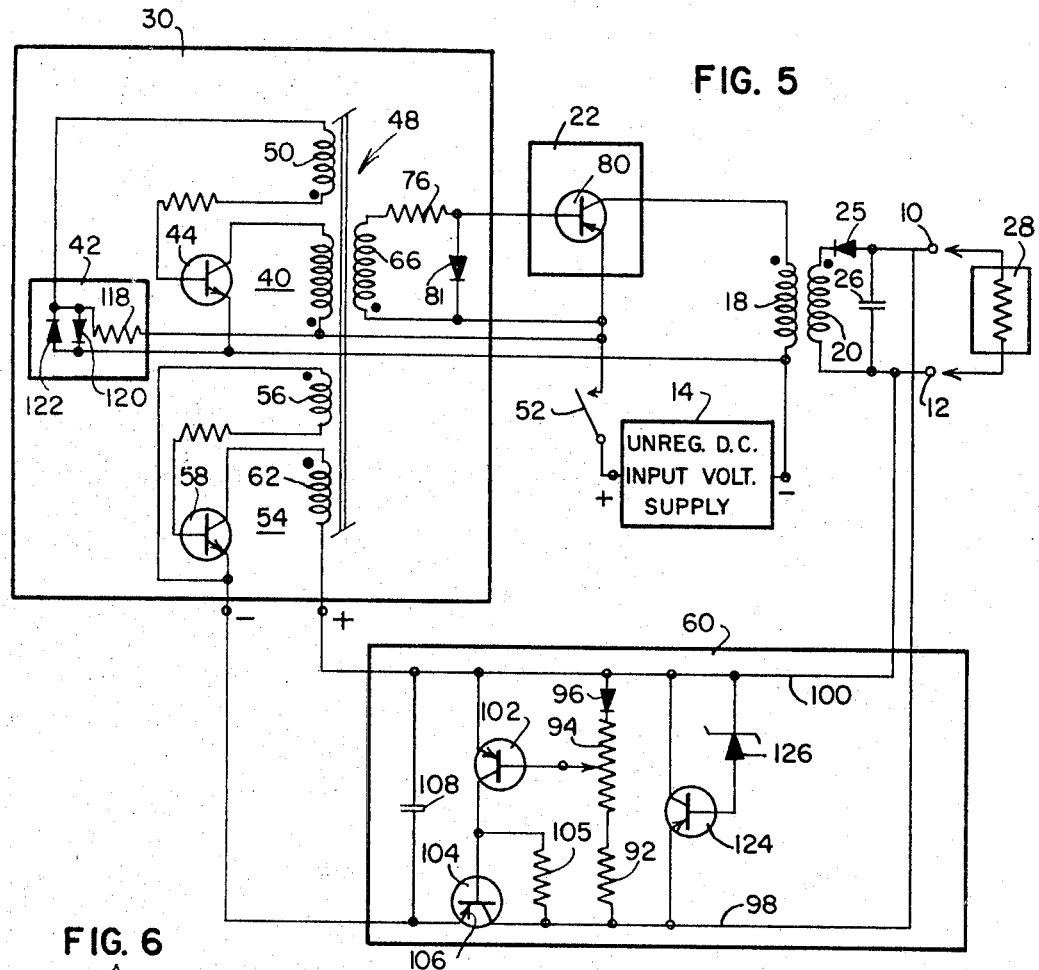
FIG. 5 schematically illustrates the entire regulator including a feedback circuit.

Referring now to FIG. 1, it is desired to derive a regulated DC output voltage between the terminals 10 and 12 from an unregulated and variable DC input voltage supply such as a battery 14 which is subject to voltage variations over its useful life. Also, the converter regulator to be described provides a constant output voltage for a variety of input voltages, with ratios of six to one or more having been attained. That is, for example, the output voltage may be a fixed 10 volts although the input voltage may be of any value between 10 and 60 volts. The converter regulator includes a power transformer 16 having a primary winding 18 and a secondary winding 20. Primary winding 18, an electronic switch 22 and supply 14 form a series drive circuit such that when switch 22 closes, current flows in the circuit to develop a potential across winding 18 which is equal to $V_B$ (input voltage from supply 14) and will remain at such value for a duration equal to the time that the switch is closed. This time will hereinafter be referred to as the "on" time ($t_{on}$). When switch 22 is opened, the field built up in the winding 18 begins to collapse and the voltage across the winding revetses. A reverse polarity voltage equal to $V_X$ is created and remains at such value for the time that the switch is open, hereinafter referred to as the "off" time ($t_{off}$). The switch alternates between open and closed states to develop the pulsating signal 23 of FIG. 2 and as shown, it has alternating polarity portions extending above ad below a zero reference axis 24. Because an inductor time averages the alternating voltage existing across it, that is, equalizes the voltage-time duration areas above and below the zero-reference axis 24, $$V_X = V_B \frac{t_{on}}{t_{off}}$$

With the polarity of the windings 18 and 20 as indicated by the dots and assuming a 1:1 turns ratio of transformer 16, the same pulsating signal 23 will also appear across secondary winding 20. If the transformer has a different turns ratio, then the respective portions of the pulsating signal across secondary winding 20 will be proportionately increased or decreased. In series with winding 20 is rectifying means which may be a diode 25, and a filtering circuit which includes a capacitor 26. The "positive" portion of the pulsating signal 23 cuts off diode 25 and the "negative" portion thereof renders the diode conductive to deliver energy into the capacitor 26 and into a load 28 energized by the converter regulator. The waveform 27 will appear across the capacitor with a peak amplitude equal to $V_X$ assuming the transformer 16 has a 1:1 turns ratio. When the switch closes the energy in the capacitor is delivered to load 28. If the capacitor is large enough relative to the size of the load 28, the voltage is smoothed out as indicated by the dotted line 29 of waveform 27 to provide a DC output voltage between terminals 10 and 12 having a value approximately equal to $V_X$ with a small amount of ripple.

Suppose that the input voltage $V_B$ doubles in which case it is desired that the output voltage remains the same and equal to $V_X$. Assume that the oscillator or control circuit 30 which controls the on and off times of switch 22 has a construction such that $t_{on}$ is inversely proportional to $V_B$ and $t_{off}$ remains unchanged. In such case, when $V_B$ doubles, $t_{on}$ halves. As stated before, transformer 16 time averages the pulsating signal 36 of FIG. 2 applied thereto so that $$V_X = 2V_B \frac{\tfrac{1}{2} t_{on}}{t_{off}}$$

and therefore the output voltage remains equal to $V_X$, as shown in the waveform 38. It is important to note that when switch 22 is closed, during which time the pulsating signal across the secondary winding 20 reflects the input voltage, no energy is delivered to capacitor 26. This fact is basic to the operation of the invention in order that $V_B$ not be reflected in the load 28.

The inductance of the primary winding 18 of transformer 16 must be large enough to maintain its magnetizing current small compared with the load current. The inductance of the secondary winding 20 must be sufficient to maintain current during the off time with light loads. The size of the respective inductances will determine the requirements for the control circuit 30.

Figure 6:
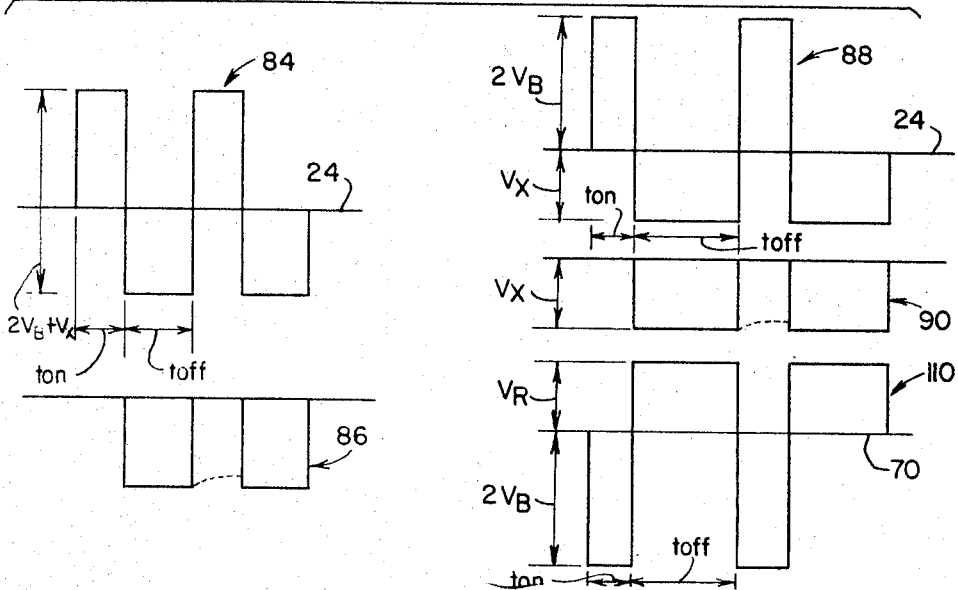
FIG. 6 shows the output waveforms and the control and pulsating signals generated in the circuit of FIG. 5.

If terminal 12 is to be ground for load 28, then the polarity of diode 25 is fixed to obtain the required polarity of the output voltage. The polarity of the transformer 16 as indicated by the dots, and the connection of the voltage supply 14 are selected so that the $V_X$ portion of the pulsating signal 23 of FIG. 2 causes conduction of diode 25. It is significant that power is delivered to the capacitor 26 only during the off time of the electronic switch 22 because if the on time is inversely proportional to the input voltage and the off time is constant then regulation is provided without feedback (as in FIG. 6). Also, delivering power during the off time means that an additional storage element such as an inductor is not necessary in the output circuit since the transformer itself stores the energy. In the art, however, power from the input DC source is delivered to the filtering circuit during the on time so that further means such as feedback is required in order to regulate. Also with the circuit of FIG. 1, no means are required to reset the power transformer 16 because the energy is stored in the transformer during the on time and is taken therefrom during the off time whereas if the opposite were true, means such as an additional winding on the transformer 16 would have to be provided to dissipate the energy due to the collapsing field during the off time.

To describe the control circuit 30 which satisfies the two criteria of constant off time and inverse proportionality between the input voltage and the on time, reference is made to FIG. 3 in which elements corresponding to those of FIG. 1 are labeled with the same reference numerals. The driver stage 40 of oscillator or control circuit 30 includes a bias circuit 42 which is coupled across the base-emitter junction of a transistor 44 to establish a bias of a value to turn on the transistor and thereby start the control circuit. The voltage supply 14 is coupled in series between the collector-emitter junction of transistor 44 and a first primary winding 46 of a saturating core-type transformer 48. A first feedback winding 50 of transformer 48 couples a portion of the alternating signal back to the base-emitter junction of the transistor 44. When the regulator is turned on by closing a manually operated switch 52, current from voltage supply 14 flows through primary winding 46 and the collector-emitter junction of transistor 44 in such a direction as to send the core material towards positive saturation and thereby furnish a negative voltage across winding 46. Due to the polarity of the windings represented by the respective locations of the dots, this induces a similariy poled voltage in feedback winding 50 which is applied to the base-emitter junction of transistor 44 and is of a polarity to aid the bias voltage from circuit 42. As the core material continues to approach and finally reaches positive saturation, the induced voltage in winding 50 maintains the transistor 44 in a saturated state.

A reset stage 54 which serves to reset the core of transformer 48 includes a second feedback winding 56 coupled between the base-emitter junction of a reset transistor 58. When transistor 44 is conducting, the negative voltage across the first primary winding 46 induces a positive voltage across the feedback winding 56 to maintain reset transistor 58 non-conductive.

When the current in first primary winding 46 has driven the core material of transformer 48 into positive saturation, the impedance of winding 46 is significantly reduced so that an increasing portion of the voltage from voltage supply 14 appears across the collector-emitter junction of transistor 44 and less voltage appears across winding 46. Thus a lesser voltage is induced in the feedback winding 50 which reduces the magnitude of the voltage across the base-emitter junction of the transistor 44. Consequently the emitter-collector impedance begins to increase and an avalanche effect is produced which rapidly decreases the current flowing through the winding 46. The voltage induced in the winding 50 by this flux collapse thus applies a voltage of opposite polarity to oppose the bias voltage from circuit 42 and thereby brings the emitter-collector impedance to its highest value.

Also as a result of the collapse in flux, an oppositely poled negative voltage is induced in feedback winding 56 which is of a direction to turn on reset transistor 58. Now, current from a reference voltage supply circuit 60 conducts current through a second primary winding 62 of transformer 48 and through the collector-emitter junction of transistor 58 to provide a voltage across the winding 62. This voltage induces a voltage across first feedback winding 50 to render transistor 44 nonconductive and a voltage across second feedback winding 56 to maintain transistor 58 conductive. The current conducted by transistor 58 drives the core of transformer 48 into negative saturation. When the core material saturates in the negative duration the flux collapses again and a reverse voltage is coupled back through feedback winding 56 to the emitter of transistor 58 to render the same non-conductive. A forward polarity voltage is coupled back to the first feedback winding 50 to forward bias the base-emitter junction of transistor 44. Current begins to flow through the collector-emitter junction of transistor 44 and winding 46 to begin a new cycle.

The control signal 64 which results from the above operation appears across the secondary winding 66 of transformer 48 and is shown in FIG. 4. Control signal 64 includes portions 68 which, assuming that transformer 48 has a 1:1:1 turns ratio between windings 46, 62 and 66, extends below the reference axis 70 by an amount equal to the battery voltage $V_B$, and portions 72 extending above the axis 70 by an amount equal to the reference voltage ($V_R$) from supply circuit 60. In practice, there may be other turns ratios but the relative amplitudes of the portions will be as shown. Control signal 64 is then coupled through resistor 76 to the electronic switch 22 which may, in the embodiment shown, comprise a transistor 80 the collector and emitter or output electrodes of which form the switch terminals. The base or control electrode receives the control signal. The diode 81 clips the upper portions 72 to preclude reverse voltage breakdown of the base-emitter junction of transistor 80. During the upper portions 72, the transistor 80 is cut off and during the lower portions 68 it is saturated so that the transistor acts like a swich which is closed by portions 68 and opened by portions 72.

It is known that in a saturating transformer, the flux build-up takes a given amount of time and is related to the supply voltage across which the transformer is connected by an inverse proportion give by $$t = K/V_S$$

where $t$ is the time for the flux to build-up to saturation, K is a constant dependent on the physical characteristic of the particular core material employed and the number of turns on the winding. The period or duration ($t_{on}$) of the portions 68 is inversely proportional to the input battery voltage, that is, $t_{on} = K/V_B$. The duration ($t_{off}$) of portion 72 is correspondingly inversely proportional to the reference voltage connected to the reset stage, that is $t_{off} = K/V_R$. Thus, if $V_R$ is constant and independent of $V_B$, and $V_B$ doubles as shown in control signal 82 of FIG. 4, then $t_{on}$ is halved and $t_{off}$ remains the same as that of control signal 64. Thus the two criteria necessary to drive switch 22 in FIG. 1 to develop a regulated output voltage between terminals 10 and 12, that is an "on" time inversely proportional to $V_B$ and an "off" time constant and independent of $V_B$, have been satisfied.

Although the regulator of FIG. 3 will provide a well regulated output voltage for a variety of input voltages and loads with ideal components, some modifications may be required due to circuit losses and the use of a saturating transformer 48 the characteristics of which are not ideal. In such case, and referring to FIG. 1, when the input voltage doubles, the pulsating signal 84 of FIG. 6 which appears across secondary winding 20 of power transformer 16 will have a peak positive-going amplitude double that of signal 23 of FIG. 2 but its on time, instead of being 50% of the signal 23 on time, would be say, 75%. The deviation from the ideal in a practical case is not nearly so great but is here assumed to be such in order to facilitate comparison.

If the off time is maintained constant, the peak-to-peak amplitude of pulsating signal 84 remains equal to $2V_B + V_X$ as in the signal 36 of FIG. 2, but the location of the reference axis 24 increases relative to the peak due to the voltage-duration averaging characteristic of transformer 16 so that after rectification by diode 25, the waveform 86 is developed across capacitor 26. Now, the output voltage is not the same as $V_X$ of waveform 27 (FIG. 2) so that perfect regulation is not attained.

To obtain good regulation with practical components, one of the criteria of control circuit 30 as stated before must be changed, that is, the off time should not be constant but rather should change in the following manner. In the pulsating signal 88 of FIG. 6, $t_{on}$ is 775% that of signal 23 of FIG. 2 and $t_{off}$ is 150% thereof. The reference axis 24, due to the voltage-duration averaging characteristic of the transformer 16, is at the same location relative to the peaks as the reference axis of waveform 36 in FIG. 2. Now, after rectification by the diode 25, the output voltage between terminals 10 and 12 will be $V_X$ as shown by waveform 90 and equal to the $V_X$ of waveform 27 of FIG. 2. Therefore, the configuration of supply circuit 60 of FIG. 5 must be such as to provide an off time equal to that of pulsating signal 88.

Referring to FIG. 5, components corresponding to FIGS. 1 and 3 are labeled with the same reference numerals. Whereas in FIG. 3, it was assumed that supply circuit 60 provided a constant reference voltage $V_R$, the circuit 60 of FIG. 5 provides a $V_R$ which is representative of the output voltage between terminals 10 and 12. The circuit 60 which may be viewed as a feedback circuit coupled between the output terminals 10 and 12 and the reset stage 54, includes a resistor 92, a potentiometer 94 which combine to form a voltage divider and a temperature compensation diode 96 coupled between a pair of conductors 98 and 100 respectively connected to the output terminals 10 and 12. The movable arm of potentiometer 94 is coupled to the base or control electrode of a voltage sensing transistor 102. The output electrode or collector of transistor 102 is coupled to the base or input electrode of a series feedback transistor 104. It will be remembered that when the input voltage doubles and there is no off time control, the output voltage increases (more negative), as shown in waveform 86 of FIG. 6. This increase in output voltage increases the transistor 102 bias which serves to decrease the collector-emitter resistance thereof which in turn decreases the bias on transistor 104 as provided by resistor 105. The resulting voltage decrease between the output electrode or emitter 106 and conductor 100 is filtered by a capacitor 108 to provide the reference voltage for reset stage 54. Since the off time of the control signal developed across the secondary winding 66 of transformer 48 is inversely proportional to the reference voltage provided by supply circuit 60, such decrease in reference voltage increases the off time.

The potentiometer 94 is adjusted to set the output voltage at which the off time starts to change to compensate for the on time not being precisely inversely proportional to the input voltage. Thus, for example, if the input voltage doubles, and the control signal 110 of FIG. 6 developed across secondary winding 66 of transformer 48 has an on time 75% that of control signal 64 of FIG. 4, it should have an off time equal to 150% that of control signal 64 which is set by the potentiometer. As can be seen, the on and off times of this signal are exactly equal to those required to develop the pulsating singal 88 across secondary winding 20 to transformer 16 to develop the output voltage of waveform 90. With the circuit of FIG. 5 a 7:1 voltage range is realizable and depending on the value of load 28, a significantly wider range may be attained.

An advantage of the present circuit either with or without the means to vary the off time is the fact that the efficiency, that is the ratio of the output power to the input power, remains high and relatively constant with changes in the input voltage because regulation is achieved through energy storage and time averaging rather than dissipation of excess voltage with a loss element.

Referring back to FIG. 5, the bias circuit 42 includes a resistor 118 and a diode 120 connected in series between the terminals of the voltage supply 14 to provide a fixed voltage across the diode for biasing the transistor 44. In order to provide a path for the base-emitter current, a second diode 122 is connected in parallel with the diode 120 but with an opposite polarity. When the input voltage from the supply 14 is at a minimum, the bias circuit 42 must supply a DC voltage of a sufficient value to bias the transistor 44 into conduction. When the input voltage is at a maximum within the range of the supply 14, the DC voltage at the base of the transistor 44 should be sufficiently small so that when the turn-off signal from the first feedback winding 50 of transformer 48 is added to it, transistor 44 is maintained non-conductive. The relatively constant drop of a forward biased diode over a wide range of currents enables the bias circuit 42 to provide these necessary bias voltages whether the input voltage is a minimum or a maximum.

As the load 28 which is to be connected to the terminals 10 and 12 decreases, the reference voltage applied to the reset stage decreases to compensate for reduced losses. However, with very small loads, the reference voltage may decrease to an extent such that the reset stage 54 is inoperable due to insufficient collector voltage, and therefore between terminals 10 and 12 increases with no compensating effect. In order to overcome this problem, a shunt regulator transistor 124 is connected bewteen conductors 98 and 100 with a zener diode connected between its base and conductor 100 to establish a fixed reference voltage for the transistor. Now, if the voltage between terminals 10 and 12 attempts to increase beyond a value necessary to operate reset stage 54, the transistor 124 conducts so as to provide additional loading and thereby maintain the reference voltage in the required operating range. It may be appreciated that such an arrangement permits use of an extremley wide range of load values. In a circuit of practical construction, loads varying from 4½ ohms to open circuit conditions were tried with excellent voltage regulation.

It will be noted that there are no DC connections between the voltage supply 14 and the output terminals 10 and 12 because the reference voltage supply circuit 60 is coupled to the driver stage by transformer coupling as is the coupling between the reset stage 54 and the output circuit consisting of the diode 25 and capacitor 26. This is very advantageous where the regulator is to be used in one environment in which the voltage supply 14 has a negative ground reference and in another environment in which the positive terminal will be grounded. The proposed regulator can correspond to whatever reference the supply has without affecting the polarity of the output circuit (diode 25 and capacitor 26). If this were not the case and, for example, positive output terminal 12 was DC coupled to the negative terminal of a negative ground voltage supply 14, then only a positive ground reference output voltage would be available between terminals 10 and 12. If in this case a negative voltage reference output voltage was required, an inverter would be necessary to thereby add additional expense to the regulator.

We claim:

1. A DC-to-DC regulator for converting a direct current input voltage into a regulated direct current output voltage including in combination; inductance means, an electronic switching device coupled in series circuit with said inductance means for applying the input voltage thereto, a control circuit coupled to said switching device and operative to control the periods of conduction thereof, said control ciricut rendering said switching device conductive for a duration substantially inversely proportional to the amplitude of the input voltage and alternately non-conducting for a substantially constant duration, whereby said switching means applies the input voltage to said inductance means to develop a pulsating signal thereacross having first and second alternating polarity portions during the conducting and non-conducting conditions respectively, said first portions of the pulsating signal having an amplitude directly proportional to the input voltage, said inductance means equalizing the voltage-duration areas of said portions whereby the amplitude of said second portions is substantially constant and independent of the amplitude of the input voltage, a filtering circuit in which the output voltage is derived, and rectifying means coupling said inductance means to said filtering circuit and poled with respect to the polarity of said inductance means and the input voltage to conduct only said second portions of said pulsating signal so that voltage is supplied to said filtering circuit only during the nonconducting condition of said switching device, whereby the output voltage has substantially constant amplitude equal to the amplitude of said second portions.

2. A DC-to-DC regulator for converting a direct current input voltage into a regulated direct current output voltage including in combination; circuit means to provide a regulated reference voltage, a control circuit to develop a control signal which alternates between first and second voltage levels and having saturating inductance means to cause said first level to exist for a first duration substantially inversely proportional to the input voltage and to cause said second level to exist for a second duration related to said reference voltage and substantially constant, further inductance means, an electronic switching device coupled in series circuit with said further inductance means and the input voltage, said switching device coupled to said control circuit to be driven into a closed state by said first level and into an open state by said second level to intermittently conduct the input voltage to said further inductance means, whereby a pulsating signal is generated across said further inductance means having first and second alternating polarity portions during said closed and open states respectively, said first portion having an amplitude directly proportional to the input voltage, said further inductance means equalizing the voltage-duration areas of said portions whereby the amplitude of said second portions is constant and independent of the amplitude of the input voltage, a filtering circuit in which the output voltage is derived, rectifying means coupled between said further inductance means and said filtering circuit and poled with respect to the polarity of said further inductance means and the input voltage to conduct said second portion and not said first portion so that voltage is supplied to said filtering circuit only during the open state of said switching device, whereby the output voltage has a substantially constant amplitude equal to the amplitude of said second portion.

3. The DC-to-DC regulator according to claim 2 wherein said circuit means includes a feedback circuit coupled between said filtering circuit and said circuit means to cause said reference voltage to vary with the output voltage to compensate for variations of said first duration from an inversely proportional relation to the input voltage.

4. The DC-to-DC regulator according to claim 2, said control circuit including first and second control devices each having associated input and output electrodes, said saturating inductance means including first and second primary windings respectively coupled to said output electrodes, first and second means respectively coupled from said output electrodes to associated input electrodes to form feedback paths, said first device being responsive to the input voltage to alternately saturate said first winding to control the length of said first duration, said second device coupled to said circuit means and responsive to said reference voltage to alternately saturate said second winding to control the length of said second duration.

5. The DC-to-DC regulator according to claim 2, wherein said control circuit includes first and second electron control devices each having associated input and output electrodes, said saturating inductance means comprising a transformer having first and second primary windings respectively coupled to said output electrodes and first and second feedback windings respectively coupled from said output electrodes to associated input electrodes to form feedback paths, said transformer further having a secondary winding coupled to said electronic switching device, said first control device responsive to the input voltage to alternately saturate the first primary winding to control the length of said first duration, said second control device coupled to said circuit means and responsive to said reference voltage to alternately saturate said second primary winding to control the length of said second duration.

6. The DC-to-DC regulator according to claim 2, wherein said further inductance means comprises a transformer having primary and secondary windings, said primary winding coupled to said electronic switching device, said filtering circuit including capacitance means, said rectifyng means comprising a diode coupled in series circuit with said secondary winding and said capacitance means.

7. A DC-to-DC regulator for converting a direct current input voltage into a regulated direct current output voltage including in combination; a feedback circuit to provide a reference voltage indicative of the output voltage, a control circuit to develop a control signal which alternates between first and second voltage levels and having a saturating core transformer to cause said first level to exist for a first duration substantially inversely proportional to the input voltage and to cause said second level to exist for a second duration substantially inversely proportional to said reference voltage, a power transformer having primary and secondary windings, an electronic switching device having a control electrode coupled to said control circuit and a pair of output electrodes coupled in series circuit with said primary winding and the input voltage, said switching device driven into a closed state by said first level and into an open state by said second level to alternately conduct the input voltage to said primary winding, whereby a pulsating signal is generated across said secondary winding having first and second alternating polarity portions during said closed and open states respectively, said first portion having an amplitude directly proportional to the input voltage, said power tarnsformer equalizing the voltage-duration areas of said portions whereby the amplitude of said second portion is constant and independent of the amplitude of said input voltage, capacitance means across which the output voltage is derived, rectifying means coupled in series circuit with secondary winding and said capacitance means and poled with respect to the polarity of said power transformer and the input voltage to conduct said second portion and not said first portion, said feedback circuit coupled between said filtering circuit and said control circuit to provide said reference voltage, whereby the output voltage has substantially constant amplitude substantially equal to the amplitude of said second portion.

8. The DC-to-DC regulator according to claim 7 wherein said feedback circuit includes a feedback transistor having an input electrode coupled to said capacitor means, an output electrode upon which said reference voltage appears, and a control electrode, bias circuit means coupled to said control electrode to establish a conduction level for said transistor which decreases with an attempted increase in the output voltage to decrease said reference voltage.

9. The DC-to-DC regulator according to claim 8 wherein said control bias circuit means includes a voltage divider coupled across said capacitance means and a sensing transistor having control and output electrodes respectively coupled to an intermediate point of said voltage divider and said control electrode of said feedback transistor, said sensing transistor responsive to an increase in said output voltage to reduce the bias on said feedback transistor and thereby reduce said reference voltage.

10. The DC-to-DC regulator according to claim 7, wherein said capacitor means is adapted to be coupled to a load which may be sufficiently low to decrease the reference voltage below a required operating level where it cannot properly control the duration of said second portion of said control signal, said feedback circuit including shunt regulator means coupled in parallel with said capacitance means to increase the effective load presented to said regulator when said load decreases below a predetermined value, whereby said reference voltage is maintained above said required operating level.

11. The DC-to-DC regulator according to claim 10, wherein said shunt regulator means includes a transistor having a control electrode and a pair of output electrodes coupled in parallel with said capacitance means, a Zener diode coupled to said control electrode to establish a fixed reference voltage therefor.

12. A DC-to-DC regulator according to claim 7 wherein said control circuit includes first and second transistors each having input, common and output electrodes, said saturating core transformer having a first primary winding coupled in series circuit with the input voltage and said common and output electrodes of said first transistor, a second primary winding coupled in series circuit with said reference voltage and said common and output electrode of said second transistor, a first feedback winding coupled between said first input and common electrodes of said first transistor, a second feedback winding coupled between said input and common electrode of said second transistor, and a secondary winding coupled to said electronic switching device, said first transistor being responsive to the input voltage to alternately saturate said first primary winding to control the length of said first duration, said second transistor responsive to said reference voltage to alternately saturate said second primary winding to control the length of said second duration.

13. The DC-to-DC regulator according to claim 12 wherein said control circuit includes a bias circuit for said first transistor having a pair of oppositely poled diodes coupled in parallel and resistor means connected thereto to form a series circuit connected across the input voltage, the junction of said resistor means and said diodes coupled to said input electrode of said first transistor, with one of said diodes poled to establish a constant bias for said first transistor and the other of said diodes poled to form a bias current path for said first transistor.

References Cited

UNITED STATES PATENTS

| 3,219,906 | 11/1965 | Keller et al. | 321—2 X |
| 3,297,959 | 1/1967 | Massey | 321—2 |
| 3,040,330 | 10/1968 | Tomota et al. | 321—2 X |
| 3,405,342 | 10/1968 | Wilkinson | 321—2 |

FOREIGN PATENTS

| 1,030,878 | 5/1958 | Germany. |

OTHER REFERENCES

Electronics, "Ringing Choke Simplifies DC to DC Conversion," Apr. 18, 1966, pp. 90–92.

JOHN F. COUCH, *Primary Examiner.*

W. H. BEHA, JR., *Assistant Examiner.*

U.S. Cl. X.R.

321—18